United States Patent [19]

Saitoh et al.

[11] Patent Number: 4,499,221

[45] Date of Patent: Feb. 12, 1985

[54] POLYURETHANE COMPOSITION IMPROVED IN DYEING PROPERTY

[75] Inventors: Minoru Saitoh; Yoshikazu Arimatsu; Katsuya Tani; Hideyuki Mitamura, all of Shiga, Japan

[73] Assignee: Toyo Boseki Kabushiki Kaisha, Japan

[21] Appl. No.: 615,647

[22] Filed: May 31, 1984

[30] Foreign Application Priority Data

May 31, 1983 [JP] Japan ............................... 58-97546
Jun. 1, 1983 [JP] Japan ............................... 58-98686

[51] Int. Cl.$^3$ .......................................... C08L 75/00
[52] U.S. Cl. ....................................... 524/109; 525/457; 525/458
[58] Field of Search ............... 524/109; 525/458, 457

[56] References Cited

U.S. PATENT DOCUMENTS

| | | | |
|---|---|---|---|
| 3,175,990 | 3/1965 | Ruehl | 528/75 |
| 3,461,101 | 8/1969 | Oertel et al. | 528/61 |
| 3,461,106 | 8/1969 | Oertel et al. | 528/61 |
| 3,475,377 | 10/1969 | Rosendahl et al. | 528/61 |
| 3,555,115 | 1/1971 | Bottomley et al. | 528/61 |

Primary Examiner—Maurice J. Welsh
Attorney, Agent, or Firm—Jones, Tullar & Cooper

[57] ABSTRACT

A polyurethane composition improved in dyeing property which comprises (A) a polyurethane and (B) a tertiary nitrogen atom-containing polymer incorporated therein in an amount sufficient to stabilize the polyurethane (A), said polymer (B) being the reaction product between (C) a tertiary nitrogen atom-containing diol and an excessive amount of (D) an organic diisocyanate, the terminal isocyanate group in said reaction product being blocked with a monoamine and/or a dialkylhydrazine.

12 Claims, No Drawings

POLYURETHANE COMPOSITION IMPROVED IN DYEING PROPERTY

The present invention relates to a polyurethane composition improved in dyeing property. More particularly, it relates to a polyurethane composition improved in affinity nity to dyes and color fastness as well as resistance to color change due to atmospheric conditions, combustion gas, light, etc.

In general, polyurethane products such as polyurethane elastic fibers, foams, elastomers, synthetic leathers, etc. can be hardly dyed, because their molecules do not have effective dye-accepting sites. On the other hand, polyurethanes are frequently used in combination with other materials such as nylons, polyesters, cottons and wools so that they are desired to have a high degree of exhaustion to the same extent as the other materials have.

In order to improve the dyeing property of polyurethanes, it has been proposed to incorporate tertiary nitrogen atom-containing compounds into polyurethanes as additives or as the monomeric components. When, however, the degree of exhaustion is enhanced, the color fastness is rather deteriorated. For instance, the increase of the degree of exhaustion produces the color change of the dyed products upon laundering and also causes the undesired staining to other non-dyed materials. When the degree of exhaustion is small, the color fastness is indeed improved. However, polyurethanes themselves are not dyed, and their products in combination with nylons, polyesters, cottons, wools, etc., particularly those using covered yarns, core yarns, etc., are reduced in value and quality, because the non-dyed portions of polyurethanes appear on stretching.

Further, the tertiary nitrogen atom-containing compounds used for improvement of the dyeing property sometimes produce serious problems in the spinning step, the post-processing step, etc. For instance, polymers comprising units of N,N-dialkylaminoethyl methacrylate as proposed in Japanese Patent Publn. (examined) Nos. 19491/61 (U.S. Pat. Nos. 3,175,990) and 2904/71 bleed out onto the surfaces of polyurethanes and produce scums at the spinning step causing breakage of filaments, color change of elastic yarns, etc.

On the manufacture of polyurethanes, the incorporation of tertiary nitrogen atom-containing diols at the stage of the reaction of the prepolymers or the incorporation of tertiary nitrogen atom-containing diamines at the stage of the chain extending reaction is known. However, the use of said tertiary nitrogen atom-containing compounds as the monomeric components in the production of high molecular weight polyurethanes tends to cause the production of gels due to side reactions. Further, it necessitates the increase of the amount of polyisocyanates so that the proportion of the soft segments in the produced polymers is decreased, whereby the elongation is lowered. Because of these reasons, the above procedure is not proper for production of the polymers to be used for manufacture of elastic fibers, which are necessitated to have a high stretching property.

Blending of low molecular weight urethane polymers comprising tertiary nitrogen atom-containing diols into segmented polyurethanes is disclosed in U.S. Pat. No. 3,555,115 and U.S. Ser. No. 405,461 (filed Aug. 5, 1982). However, the polyurethane elastic fibers obtained by such procedure are low in color fastness.

It is a main object of the present invention to provide a polyurethane composition improved in dyeing property and color fastness. Another object of this invention is to provide a polyurethane composition improved in resistance to color change due to gas or light. A further object of the invention is to provide a polyurethane composition excellent in physical properties such as molding property and mechanical strength. These and other objects will be apparent to those skilled in the art from the foregoing and subsequent descriptions.

According to the present invention, there is provided a polyurethane composition improved in dyeing property and color fastness which comprises (A) a polyurethane and (B) a tertiary nitrogen atom-containing polymer incorporated therein in an amount sufficient to stabilize the polyurethane (A), said polymer (B) being the reaction product between (C) a tertiary nitrogen atom-containing diol and an excessive amount of (D) an organic diisocyanate, the terminal isocyanate group in said reaction product being blocked with a monoamine and/or a dialkyl-hydrazine.

The polyurethane composition of the invention shows markedly improved dyeing property and color fastness and provides fairly and fastly dyed products. Further, it exhibits high resistance to color change due to gas. When an antioxidizing agent, a light resisting agent or the like is additionally incorporated therein, the stability or resistance to light is synergistically increased. On the manufacture of shaped products from said composition, any trouble is not produced in the step for shaping or the step for post-processing. In addition, depression in physical properties, lowering in whiteness, dyeing unevenness due to heat history, etc. are not produced.

The polyurethane (A) to be used in the composition of this invention may be an elastic high molecular weight polymer comprising an urethane bond (—NH-COO—) in the molecule. The polyurethane (A) may be obtained, for instance, by the reaction among (a) at least one of diisocyanates such as 4,4'-diphenylmethane diisocyanate, 1,4-phenylene diisocyanate, 2,4-tolylene diisocyanate, naphthalene diisocyanate, hexamethylene diisocyanate, 1,4-cyclohexane diisocyanate, 4,4'-dicyclohexylmethane diisocyanate and xylylene diisocyanate (preferably 4,4'-diphenylmethane diisocyanate), (a') at least one of substantially linear polymers of 600 to 7,000 in molecular weight having hydroxyl groups at both terminals such as polytetramethylene ether diol, polycaprolactone diol and polyester diols, said polyester diols being obtainable by reacting at least one of glycols (e.g. ethylene glycol, 1,4-butanediol, 1,6-hexanediol, neopentyl glycol) with at least one of aliphatic dicarboxylic acids (e.g. succinic acid, glutaric acid, adipic acid, suberic acid, azelaic acid, sebacic acid, dodecanedicarboxylic acid, beta-methyladipic acid, hexahydroterephthalic acid) and aromatic dicarboxylic acids (e.g. terephthalic acid, isophthalic acid) and having a melting point of not more than 60° C. (preferably of not more than 40° C.) and (a'') at least one of polyfunctional active hydrogen compounds such as polyamines (e.g. hydrazine, ethylene diamine, 1,2-propylene diamine, hexamethylene diamine, xylylene diamine, 4,4'-diaminodiphenylmethane), 4,4'-diphenylmethane disemicarbazide, beta-aminopropionic acid hydrazide, carbodihydrazide, water, ethylene glycol and 1,4-butanediol, optionally with (a''') at least one of terminating agents such as monoamines and monoalcohols. These polyurethanes may have usually a weight average molecular weight of not less than 10,000, preferably of 20,000 to 100,000, particularly preferably of 30,000 to 60,000.

The polymer (B), i.e. the reaction product between the tertiary nitrogen atom-containing diol (C) and an excessive amount of the organic diisocyanate (D), the terminal isocyanate group in said reaction product being blocked, can enhance the color fastness remarkably in comparison with the reaction product between the organic diisocyanate (D) and an excessive amount of the tertiary nitrogen atom-containing diol (C), the terminal group in said reaction product being a hydroxyl group. The polymer (B) as the modifier for the polyurethane (A) is obtainable by reacting the diol (C) with an excessive amount of the organic diisocyanate (D) and blocking the terminal isocyanate group in the resulting product with a monoamine and/or a dialkylhydrazine.

As the tertiary nitrogen atom-containing diol (C), there may be used, for instance, any one representable by the formula:

 (I)

wheren A is a divalent group of the formula:

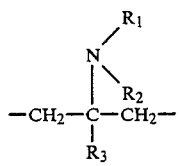 (II)

wherein $R_1$ and $R_2$ are, the same or different, each a $C_1$-$C_4$ alkyl group (e.g. methyl, ethyl, propyl, butyl), or when taken together with the adjacent nitrogen atom, they may represent a nitrogen-containing heterocyclic ring (e.g. pyrrolidino, piperidino) and $R_3$ is a $C_1$-$C_4$ alkyl group (e.g. methyl, ethyl, propyl, butyl), or of the formula:

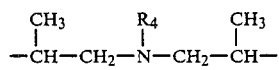 (III)

wherein $R_4$ is a $C_1$-$C_{12}$ alkyl group (e.g. methyl, ethyl, propyl, butyl). Particularly preferred are the diols (I) wherein A is represented by the formula (II) wherein $R_1$ and $R_2$ are each a $C_1$-$C_4$ alkyl group or by the formula (III) wherein $R_4$ is ethyl, the latter being excellent in resistance to chlorine.

The correlation between the degree of exhaustion and the diol (I) is varied with the carbon numbers of the groups $R_1$ to $R_4$ in the tertiary nitrogen atom-containing group of the formula (II) or (III) or with its molecular structure. When, for instance, the carbon numbers are larger or the steric hindrance is greater, the degree of exhaustion is lowered. Thus, smaller carbon numbers of the groups $R_1$ to $R_4$ make a greater degree of exhaustion. When the diol (I) having the groups $R_1$ to $R_4$ of great carbon numbers is to be used, the one having the groups $R_1$ to $R_4$ of small carbon numbers may be used together so that the degree of exhaustion is improved with enhancement of the resistance to color change and the light resistance.

Examples of the organic diisocyanate (D) are aromatic diisocyanates (e.g. 4,4'-diphenylmethane diisocyanate, 1,4-phenylene diisocyanate, 2,4-tolylene diisocyanate, naphthalene diisocyanate), aliphatic diisocyanates (e.g. 1,4-cyclohexane diisocyanate, 4,4'-dicyclohexylmethane diisocyanate, isophorone diisocyanate, ethylene diisocyanate, trimethylene diisocyanate, tetramethylene diisocyanate, hexamethylene diisocyanate, 3,3-dimethylpentane diisocyanate), etc. Among them, aliphatic diisocyanates are favored.

The molar proportion of the tertiary nitrogen atom-containing diol (C) and the organic diisocyanate (D) to be reacted may be 1:1.02-2, preferably 1:1.05-1.50. When the amount of the organic diisocyanate (D) is smaller than the lower limit, the color fastness may be insufficient. When the amount of the organic diisocyanate (D) is larger than the upper limit, scums may be produced in the step for spinning or the step for post-processing.

As the monoamine to be used as the blocking agent, there may be used a secondary amine (e.g. diethylamine, di-isobutylamine, di-n-butylamine, methyl-ethylamine, methyl-n-propylamine, diisopropylamine, allyl-ethylamine, dicyclobutylamine, piperidine, ethyleneimine, propyleneimine), a primary amine (e.g. ethylamine, n-butylamine, laurylamine), etc. In any case, the carbon number in the monoamine is preferred to be not more than 20. Examples of the dialkylhydrazine are N,N-dimethylhydrazine, N,N-diisopropylhydrazine, N-methyl-N-etyhlhydrazine, N-methyl-N-laurylhydrazine, etc. The one having not more than 20 carbon atoms is preferable. When the carbon number is too large, the weight proportion of the moiety of the blocking agent in the polymer (B) is relatively large so that the incorporation of the polymer (B) in a great amount becomes necessary for assurance of the stabilization. In addition, the compatibility of the polymer (B) into the polyurethane (A) is disadvantageously lowered. Preferred examples of the blocking agent are diethylamine, n-butylamine, N,N-dimethylhydrazine, etc.

The amount of the polymer (B) to be incorporated into the polyurethane (A) according to the invention may be such as assuring the resistance to color change. Usually, the polymer (B) may be incorporated into the polyurethane (A) in a concentration of 10 to 400 milliequivalents (in terms of the tertiary nitrogen atom), preferably 20 to 200 milliequivalents, per kilogram of the polyurethane (A). When the concentration is smaller than the lower limit, a sufficient improving effect can not be produced. When the concentration is larger than the upper limit, scums are apt to be produced in the step for preparation of filaments so that the resulting product is not suitable for manufacture of fibers. When the content of the tertiary nitrogen atom in the polymer (B) is low, a large amount of the polymer (B) must be used so that the physical properties of the polyurethane (A) is deteriorated. Thus, the content of the tertiary nitrogen atom in the polymer (B) is desired to be kept at a certain level or more. Normally, the amount of the polymer (B) to be incorporated into the polyurethane (A) may be from 0.1 to 20% by weight, particularly from 0.2 to 10% by weight, on the basis of their combined weight. Taking this into consideration, the content of the tertiary nitrogen atom in the polymer (B) may be appropriately decided. The polymer (B) is preferred to have a number average molecular weight of not more than 10,000, particularly from 2,000 to 6,000.

When desired, the composition of the invention may comprise additionally any additive such as an antioxidizing agent (e.g. a hindered phenol antioxidant, a hindered amine antioxidant) or a ultraviolet ray absorber (e.g. a benzotriazole ultra violet ray absorber). The choice of such additive as not causing the decrease of the resistance to color change due to gas is desired. As the hindered phenol antioxidant which does not cause the decrease of the resistance to color change due to gas, there may be used those of the formulas:

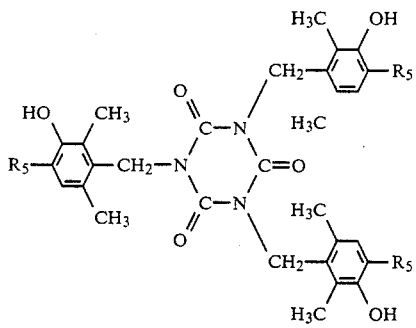

and

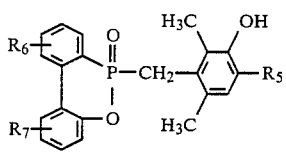

wherein $R_5$ is lower alkyl group, a cyclo(lower)alkyl group, a neopentyl group or an ar(lower)alkyl group such as phenyl(lower)alkyl and $R_6$ and $R_7$ are each a hydrogen atom, a lower alkyl group or a lower alkoxy group. The term "lower" as herein used is intended to mean any group having not more than 12 carbon atoms, particularly not more than 8 carbon atoms.

As the phenolic compound (IV), there may be exemplified 1,3,5-tris(4-t-butyl-3-hydroxy-2,6-dimethylbenzyl)isocyanurates, 1,3,5-tris(4-sec-butyl-3-hydroxy-2,6-dimethylbenzyl)isocyanurates, 1,3,5-tris(4-neopentyl-3-hydroxy-2,6-dimethylbenzyl)isocyanurates, etc. Among them, 1,3,5-tris(4-t-butyl-3-hydroxy-2,6-dimethylbenzyl)isocyanurates are most preferred. As the phenolic compound (V), preferred are those wherein $R_5$ is a branched alkyl group, a cycloalkyl group, a neopentyl group or an aralkyl group, these having preferably 4 to 8 carbon atoms. Their specific examples are 10-(2',6'-dimethyl-4'-t-butyl-3'-hydroxybenzyl)-9,10-dihydro-9-oxa-10-phosphaphenanthrene-10-oxide, 6-methyl-10-(2',6'-dimethyl-4'-t-butyl-3'-hydroxybenzyl)-9,10-dihydro-9-oxa-10-phosphaphenanthrene-10-oxide, 6-methoxy-10-(2',6'-dimethyl-4'-t-butyl-3'-hydroxybenzyl)-9,10-dihydro-9-oxa-10-phosphaphenanthrene-10-oxide, 10-(2',6'-dimethyl-4'-cyclohexyl-3'-hydroxybenzyl)-9,10-dihydro-9-oxa-10-phosphaphenanthrene-10-oxide, 10-[2',6'-dimethyl-4'-(α,α-dimethylbenzyl)-3'-hydroxybenzyl]-9,10-dihydro-9-oxa-10-phosphaphenanthrene-10-oxide, 10-(2',6'-dimethyl-4'-neopentyl-3'-hydroxybenzyl)-9,10-dihydro-9-oxa-10-phosphaphenanthrene-10-oxide, etc. In the combined use with the polymer (B), these phenolic compounds (IV) or (V) can produce a synergistic effect on the light resistance. The amount of the phenolic compound (IV) or (V) may be the one sufficient to stabilize the composition of the invention to light and is usually from 0.1 to 10% by weight, preferably from 0.5 to 8% by weight, based on the weight of the polyurethane (A).

Also, the composition of the invention may optionally contain a sugar fatty acid ester to improve the resistance to color change due to gas as well as the resistance to chlorine. Said sugar fatty acid ester may be an esterified product of one molecule of sucrose with 1 to 3 molecules of a fatty acid, which is representable by the formula:

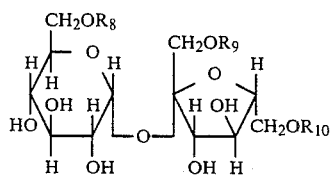

wherein $R_8$, $R_9$ and $R_{10}$ are, the same or different, each a hydrogen atom or a $C_{12}$-$C_{18}$ acyl group, at least one of $R_8$, $R_9$ and $R_{10}$ being an acyl group. Examples of the sugar fatty acid ester are sucrose monolaulate, sucrose monomyristate, sucrose monopalmitate, sucrose monostearate, sucrose monooleate, sucrose monolinolate, sucrose monolinolenate, sucrose monosinnolate, sucrose dilaulate, sucrose dimyristate, sucrose dipalmitate, sucrose distearate, sucrose dioleate, sucrose trilaulate, sucrose trimyristate, sucrose tripalmitate, sucrose tristearate, sucrose trioleate, etc. The amount of the sugar fatty acid ester (VI) may be generally from 0.01 to 5% by weight, preferably from 0.1 to 2% by weight, based on the weight of the polyurethane (A).

The composition of the invention may further comprise any other conventional additive(s) such as inorganic fine powders (e.g. barium sulfate, titanium oxide, silicates, zinc oxide, zinc sulfide), tack inhibitors or lubricants (e.g. calcium stearate, magnesium stearate, polytetrafluoroethylene, organopolysiloxane) and antifungal agents and pigments.

For preparation of the composition of the invention, the polyurethane (A) may be incorporated with the polymer (B) and, if used, any other component(s) as stated above at any stage for production of the polyurethane (A), preferably after the completion of the polymerization and before the molding of the produced polymer.

The thus obtained composition of the invention may be shaped into fibers, tapes, films, sheets, etc. by dry, wet or melt molding. Further, it can be used for production of foams, molded articles, synthetic leathers, paints, binders, adhesives, etc. Its use as fibers, particularly for clothes, and tapes is especially advantageous.

When the polyurethane composition of the invention, particularly the one comprising the polymer (B) using a secondary amine having a lower alkyl group as the blocking agent, is shaped and then subjected to heat treatment, at least a portion of the blocking agent is released to make an isocyanate group, and the polyurethane molecules are crosslinked to give a higher molecular weight. In that case, physical properties such as modulus, recovery from stretching and chemical resistance are advantageously enhanced. Also, the polyurethane composition incorporated with the polymer (B) blocked with an amino compound, particularly a dialkylhydrazine, is advantageous in that the dialkylhydrazine moiety serves to improve resistance to color change due to gas and light resistance. In case of the tertiary nitrogen atom-containing polymer terminated with a hydroxyl group(s), said advantageous improvements as seen on the use of the polymer (B) wherein the terminal positions are blocked with an amino compound, are not produced. Further, the wetting fastness is disadvantageously lowered with the increase of the dyeing property. This is probably due to the promotion of bleeding of the dyestuff by the hydrophilic property of the terminal hydroxyl group.

Practical and presently preferred embodiments of the present invention are illustratively shown in the following Examples wherein % and part(s) are by weight unless otherwise indicated. The molecular weight indicates the weight average molecular weight for the polyurethane (A) and the number average molecular weight for the polymer (B).

The physical properties of the products were determined by the following methods:

Test for color change due to gas:

According to the method as described in JIS No. L-0855-1976, three units were subjected to the test. The b values before and after the test were measured by the use of a color difference meter (manufactured by Nippon Denshoku Kogyo K.K.; Model ND-101D), and the extent of color change was indicated by the difference (Δb) between them.

Test for dyeing property:

Polyurethane fibers of 40 denier were scoured and then subjected to dyeing under the following conditions:

C.I. Acid Red 6: 1 %owf
"New Born TS" (manufactured leveling agent): 5 %owf by Nikka Kagaku K.K.;
pH: 3.5
Bath ratio: 1 : 50, 100° C.×60 min. dyeing.

Observation was made on dyeing property as well as fastness to laundering (JIS No. L-0844-1976; A-2 method; same cloth staining, cotton staining, silk staining).

Test for resistance to light:

Polyurethane fibers of 40 denier were scoured in an aqueous solution of "Neugen HC" (manufactured by Daiichi Kogyo Seiyaku K.K.; non-ionic surfactant) (1 g/liter) at 80° C. for 20 minutes. Irradiation was made with a fadeometer for 20, 40, 60 or 80 hours. From the tenacity curve obtained by a Tensilon measuring apparatus, the irradiation time (T½) during which the tenacity was decreased to half was decided.

Test for scum:

Cheese-wound polyurethane fibers of 40 denier were admitted in a double covering machine (manufactured by Kataoka Kikai K.K.), and the fibers were elongated under the following conditions: feed speed, 5 m/min; elongation rate between the feed rooler and the 1st roller, 100%; the elongation rate between the 1st roller and the 2nd roller, 250 %. After the continuous operation over a period of 16 hours, the degree of scum at the surface of the 2nd roller was observed visually and graded into 5 indexes, i.e. 1 (no scum) to 5 (remarkable scum).

Breaking strength:

The breaking strength (g/d) was determined by stretching the polyurethane fibers at a rate of 1000%/min.

Modulus:

The tensile stress (g) was determined by stretching the polyurethane fibers up to 300% at a rate of 1000%/min.

Intrinsic viscosity:

The intrisic viscosity was measured at 30° C. in N,N-dimethylacetamide with a concentration of 0.3 g/100 ml.

Molecular weight:

The polymer having a molecular weight of not less than 3,000 was determined by gel permeation chromatography (GPC) or by intrinsic viscosity. As to the polymer having a molecular weight of less than 3,000, determination was made by the use of a vapor pressure osmometer.

Resistance to chlorine:

Polyurethane fibers of 40 denier was treated with city water (chlorine content, 0.15 ppm) for 24, 36 or 48 hours and subjected to measurement of tensile strength, from which the retention was calculated. The resistance to chlorine was represented by the total value of the retentions at 24, 36 and 48 hours.

EXAMPLE 1

A mixture of polytetramethylene ether glycol (molecular weight, 1950) (1950 parts) and 4,4'-diphenylmethane diisocyanate (500 parts) was stirred at 70° C. for 60 minutes to give a prepolymer having isocyanate groups at both terminal positions. Dimethylformamide (4478 parts) was added thereto to make a uniform solution. The resultant solution was cooled to 0° C., a 46% paste of titanium oxide pigment containing a small quantity of blueing pigment in dimethylformamide (145 parts) was added thereto, and a solution of 1,2-propylenediamine (74 parts) in dimethylformamide (983 parts) was further added thereto quickly at the initial stage and slowly at the later stage while stirring, whereby the chain extension proceeded. When 90% of 1,2-propylenediamine was added, the viscosity reached to 2500 poise at 25° C. A solution of monoethanolamine (12 parts) in dimethylformamide (72 parts) was added to the reaction mixture so as to consume the free isocyanate therein. Then, a solution of acetic anhydride (10 parts) in dimethylformamide (72 parts) was added thereto to stabilize the viscosity of the polymer solution. The thus obtained polymer solution (hereinafter referred to as "A dope") had a solid content of 32% and a viscosity of 2200 poise at 25° C.

Separately, 2-ethyl-2-di-n-butylamino-1,3-propanediol (70 parts) and dimethylformamide (164 parts) were charged in a four-necked flask equipped with a nitrogen-introducing inlet, a thermometer, a cooler, a stirrer and a dropping funnel. The content was heated on an oil bath to a temperature of 60 to 70° C. while stirring, and 4,4'-dicyclohexylmethane diisocyanate (89 parts) was dropwise added thereto from the dropping funnel taking care not to elevate the temperature above 70° C. After completion of the addition, the resultant mixture was stirred at 70° C. for 20 hours. Diethylamine (5.7 parts) was added to the mixture, followed by stirring at 70° C. for 3 hours to give a solution of the tertiary nitrogen atom-containing polymer having a molecular weight of 4,000. The tertiary nitrogen atom-containing polymer solution was dissolved in the A dope so as to make the tertiary nitrogen atom content being 80 milliequivalents/kg of the polyurethane. 1,3,5-Tris(4-t-butyl-3-hydroxy-2,6-dimethylbenzyl)isocyanurate was added thereto in an amount of 0.32 part per 100 parts of the A dope, and the resulting mixture was subjected to dry spinning by a conventional procedure to make polyurethane elastomer fibers of 40 denier.

The obtained fibers were subjected to tests for resistance to color change due to gas, dyeing property and fastness to laundering. The results are shown in Table 1.

EXAMPLE 2

Using the same flask as in Example 1, 4,4'-dicyclohexylmethane diisocyanate (99.6 parts) was added to a mixture of 2-ethyl-2-dimethylamino-1,3-propanediol (50.4 parts) and dimethylformamide (200 parts) to give a solution of the tertiary nitrogen atom-containing polymer having a molecular weight of 4,000. The polymer solution was added to the A dope to make the tertiary nitrogen atom content of 80 milliequivalents/kg of the polyurethane, and 10-(2',6'-dimethyl-4'-t-butyl-3'-hydroxybenzyl)-9,10-dihydro-9-oxa-10-phosphaphenanthrene-10-oxide was added thereto in an amount of 0.32 part per 100 parts of the A dope. The resulting mixture was subjected to dry spinning to make polyurethane elastomer fibers of 40 denier.

The fibers were subjected to tests for resistance to color change due to gas, dyeing property and fastness to laundering. The results are shown in Table 1.

EXAMPLE 3

Using the same flask as in Example 1, 4,4'-dicyclohexylmethane diisocyanate (192.2 parts) was added to a mixture of 4-methyl-4-aza-2,6-heptanediol (97.2 parts) and dimethylformamide (370 parts) to give a solution of the tertiary nitrogen atom-containing polymer having a molecular weight of 4,000. The polymer solution was added to the A dope to make the tertiary nitrogen atom content of 80 milliequivalents/kg of the polyurethane, and 10-(2',6'-dimethyl-4'-t-butyl-3'-hydroxybenzyl)-9,10-dihydro-9-oxa-10-phosphaphenanthrene-10-oxide was added thereto in an amount of 0.32 part per 100 parts of the A dope. The resulting mixture was subjected to dry spinning to make polyurethane elastomer fibers of 40 denier.

The fibers were subjected to tests for resistance to color change due to gas, dyeing property and fastness to laundering. The results are shown in Table 1.

COMPARATIVE EXAMPLES 1 TO 3

The A dope not incorporated with any additive (Comparative Example 1), the A dope incorporated with 1,3,5-tris(4-t-butyl-3-hydroxy-2,6-dimethylbenzyl)isocyanurate in an amount of 1% to the polyurethane (Comparative Example 2) and the A dope incorporated with 1,3,5-tris(4-t-butyl-3-hydroxy-2,6-dimethylbenzyl)isocyanurate in an amount of 1% to the polyurethane and poly(N,N-diethylaminoethyl methacrylate) in an amount of 80 milliequivalents per kg of the polyurethane (Comparative Example 3) were respectively subjected to dry spinning as in Example 1 to make polyurethane elastomer fibers of 40 denier.

The fibers were subjected to tests for resistance to color change due to gas, dyeing property and resistance to light. The results are shown in Table 1.

COMPARATIVE EXAMPLE 4

Using the same flask as in Example 1, 4,4'-dicyclohexylmethane diisocyanate (131.0 parts; 0.500 mole) was added to a mixture of 2-ethyl-2-dimethylamino-1,3-propanediol (81.6 parts; 0.555 mole) and dimethylformamide (212.6 parts) to give a solution of the tertiary nitrogen atom-containing polymer having a molecular weight of 3,500. The polymer solution was added to the A dope to make the tertiary nitrogen atom content of 80 milliequivalents per kg of the polyurethane, and 10-(2',6'-dimethyl-'4-t-butyl-3'-hydroxybenzyl)-9,10-dihydro-9-oxa-10-phosphaphenanthrene-10-oxide was added thereto in an amount of 0.32 part per 100 parts of the A dope. The resulting mixture was subjected to dry spinning to make polyurethane elastomer fibers of 40 denier.

The fibers were subjected to tests for resistance to color change due to gas, dyeing property and resistance to light. The results are shown in Table 1.

TABLE 1

| Example | Resistance to color change due to gas (Δb) | Dyeing property | Fastness to laundering (A-2) | | | Resistance to light T (½) (hrs) |
|---|---|---|---|---|---|---|
| | | | Same cloth | Cotton | Silk | |
| 1 | 5.5 | O | 4–5 | 5 | 5 | 43 |
| 2 | 5.8 | O | 4–5 | 5 | 5 | 40 |
| 3 | 5.9 | O | 4 | 5 | 5 | 39 |
| Comparative | | | | | | |
| 1 | 28.6 | X | — | — | — | 20> |
| 2 | 29.0 | X | — | — | — | 35 |
| 3 | 21.7 | O | 2 | 4 | 3–4 | 36 |
| 4 | 7.0 | O | 2–3 | 4–5 | 4–5 | 38 |

From the above results, it is understood that the fibers obtained according to the invention are excellent in resistance to color change due to gas, dyeing property and fastness to laundering. They are also excellent in resistance to light.

EXAMPLES 4 TO 7

To a mixture of 2-ethyl-2-dimethylamino-1,3-propanediol (75.6 parts) and dimethylformamide (300 parts), 4,4'-dicyclohexylmethane diisocyanate (149.4 parts) was gradually added, and the reaction was carried out at 70° C. for 20 hours. Dimethylhydrazine (6.8 parts) was added thereto, and the resultant mixture was further allowed to react at 70° C. for 3 hours to make a solution of the tertiary nitrogen atom-containing polymer having a molecular weight of 3,500. The polymer solution was added to the A dope as obtained in Example 1 so as to make the tertiary nitrogen atom content of 10 (Example 4), 40 (Example 5), 160 (Example 6) or 320 (Example 7) milliequivalents per kg of the polyurethane. The resulting mixture was subjected to dry spinning to make polyurethane elastomer fibers of 40 denier.

The fibers were respectively subjected to tests for resistance to color change due to gas, dyeing property and fastness to laundering. The results are shown in Table 2.

COMPARATIVE EXAMPLES 5 AND 6

The A dope incorporated with poly(N,N'-diethylaminoethyl methacrylate) in an amount of 0.7% to the polymer (Comparative Example 5) and the A dope incorporated with the tertiary nitrogen atom-containing polymer having hydroxyl groups at both terminal positions as used in Comparative Example 4 (Comparative Example 6) were respectively subjected to dry spinning as in Example 1 to make polyurethane elastomer fibers.

The fibers were subjected to tests for resistance to color change due to gas, dyeing property and fastness to laundering. The results are shown in Table 2.

TABLE 2

| Example | Tertiary nitrogen atom content (milliequivalents/kg) | Resistance to color change due to gas ($\Delta b$) | Dyeing property | Fastness to laundering (A-2) | | | |
|---|---|---|---|---|---|---|---|
| | | | | Same cloth | Cotton | Silk | Scum |
| 4 | 10 | 15.5 | Δ | 5 | 5 | 5 | 1 |
| 5 | 40 | 10.0 | O | 4–5 | 5 | 5 | 2 |
| 6 | 160 | 5.2 | O | 4–5 | 5 | 5 | 4 |
| 7 | 320 | 5.0 | O | 3–4 | 4–5 | 4–5 | 5 |
| Comparative | | | | | | | |
| 5 | 40 | 22.5 | Δ-O | 2–3 | 4 | 3–4 | 4 |
| 6 | 160 | 6.8 | O | 2 | 4 | 4 | 5 |

From the above results, it is understood that the fibers obtained according to the invention are excellent in resistance to color change due to gas, dyeing property and fastness to laundering.

EXAMPLE 8

A mixture of 4-ethyl-4-aza-2,6-heptanediol (86.5 parts) and dimethylformamide (250.0 parts) was stirred at 65° to 70° C., and 4,4'-dicyclohexylmethane diisocyanate (156.2 parts) was gradually added thereto. After completion of the addition, the resultant mixture was allowed to react at 65° to 70° C. for 20 hours. Dimethylhydrazine (7.3 parts) was gradually added to the mixture to give a solution of the tertiary nitrogen atom-containing polymer having a molecular weight of 4,000. The completion of the reaction was confirmed by checking the disappearance of the absortion attributable to the NCO group at 2250 cm$^{-1}$ in infrared absorption spectrum. The polymer solution was dissolved in the A dope as obtained in Example 1 to make the tertiary nitrogen atom content of 80 milliequivalents per kg of the polyurethane, and 1,3,5-tris(4-t-butyl-3-hydroxy-2,6-dimethylbenzyl)isocyanurate was added thereto in an amount of 0.32 part per 100 parts of the A dope. The resulting mixture was subjected to dry spinning to make polyurethane elastomer fibers of 40 denier.

The fibers were subjected to tests for resistance to color change due to gas, dyeing property and fastness to laundering. The results are shown in Table 3.

EXAMPLE 9

A mixture of 4-ethyl-4-aza-2,6-heptanediol (68.4 parts) and dimethylformamide (200.0 parts) was stirred at 65° to 70° C., and 4,4'-dicyclohexylmethane diisocyanate (124.7 parts) was gradually added thereto. After completion of the addition, the resultant mixture was allowed to react at 65° to 70° C. for 20 hours. Diethylamine (6.9 parts) was then gradually added to the mixture to give a solution of the tertiary nitrogen atom-containing polymer having a molecular weight of 4,000. The completion of the reaction was confirmed by checking the disappearance of the absorption attributed to the isocyanate group at 2250 cm$^{-1}$ in infrared absorption spectrum. The polymer solution was added to the A dope as obtained in Example 1 to make the tertiary nitrogen atom content of 80 milliequivalents per kg of the polyurethane, and 10-(2',6'-dimethyl-4'-t-butyl-3'-hydroxybenzyl)-9,10-dihydroxy-9-oxa-10-phosphaphenanthrene-10-oxide was added thereto in an amount of 0.32 part per 100 parts of the A dope. The resulting mixture was subjected to dry spinning to make polyurethane elastomer fibers of 40 denier.

The fibers were subjected to tests for resistance to color change due to gas, dyeing property and fastness to laundering. The results are shown in Table 3.

EXAMPLE 10

In the same manner as in Example 9 but using n-butylamine as the blocking agent instead of diethylamine, there were obtained polyurethane elastomer fibers of 40 denier.

The fibers were subjected to tests for resistance to color change due to gas, dyeing property and fastness to laundering. The results are also shown in Table 3.

COMPARATIVE EXAMPLE 7

Using the same flask as in Example 1, 4,4'-dicyclohexylmethane diisocyanate (89.2 parts) was added to a mixture of 4-ethyl-4-aza-2,6-heptanediol (60.8 parts) and dimethylformamide (150 parts) to give a solution of the tertiary nitrogen atom-containing polymer having a molecular weight of 4,000. The polymer solution was added to the A dope to make the tertiary nitrogen atom content of 80 milliequivalents per kg of the polyurethane, and 1,3,5-tris(4-t-butyl-3-hydroxy-2,6-dimethylbenzyl)isocyanurate was added thereto in an amount of 0.32 part per 100 parts of the A dope. The resulting mixture was subjected to dry spinning to make polyurethane elastomer fibers of 40 denier. The fibers were subjected to tests for resistance to color change due to gas, dyeing property and resistance to light. The results are shown in Table 3.

TABLE 3

| Example | Resistance to color change due to gas ($\Delta b$) | Dyeing property | Fastness to laundering (A-2) | | | Resistance to light T (½) (hrs) |
|---|---|---|---|---|---|---|
| | | | Same cloth | Cotton | Silk | |
| 8 | 3.3 | O | 3 | 5 | 5 | 42 |
| 9 | .4.5 | O | 2–3 | 5 | 5 | 40 |
| 10 | 5.0 | O | 4 | 5 | 5 | 39 |
| Comparative 7 | 10.8 | O-Δ | 1–2 | 4–5 | 4–5 | 37 |

From the above results, it is understood that the polyurethane elastic fibers obtained according to this invention are markedly improved in resistance to color change due to gas, dyeing property and resistance to light. Further, they are good in fastness to laundering. The fibers obtained in Comparative Example 7 wherein the tertiary nitrogen atom-containing polymer not using the organic diisocyanate in excess and not using the blocking agent were inferior in resistance to color change due to gas, resistance to light, dyeing property and resistance to laundering.

EXAMPLES 11 TO 13

The tertiary nitrogen atom-containing polymer solution obtained in Example 8 was dissolved in the A dope to make a tertiary nitrogen content of 80 milliequivalents per kg of the polyurethane. The resulting solution was subjected to dry spinning to obtain polyurethane elastic fibers of 40 denier.

In the same manner as above but replacing the alkyl group at the 4-position of the tertiary nitrogen atom-containing diol by methyl or isopropyl, there were prepared polyurethane elastic fibers.

The fibers were subjected to tests for resistance to color change due to gas, dyeing property, resistance to light and resistance to chlorine. The results are shown in Table 4

TABLE 4

| Example | Tertiary nitrogen atom-containing polymer (the alkyl group at the 4-position of the diol) | Resistance to color change due to gas ($\Delta b$) | Dyeing property | Resistance to light T ($\frac{1}{2}$) (hrs) | Resistance to chlorine (%) |
|---|---|---|---|---|---|
| 11 | Methyl | 4.9 | O | 31 | 148 |
| 12 | Ethyl | 3.6 | O | 33 | 226 |
| 13 | Isopropyl | 5.8 | O | 31 | 215 |
| Comparative 1 | Not added | 28.6 | X | 20> | — |

From the above results, it is understood that the fibers obtained according to this invention are improved in resistance to color change due to gas, dyeing property and resistance to light. Especially when the alkyl group at the 4-position is ethyl, there were obtained excellent fibers of which said performances and resistance to chlorine are well balanced.

EXAMPLE 14

The A dope (100 parts) as obtained in Example 1 was incorporated with a sugar fatty acid ester (0.5 part) and subjected to dry spinning as in Example 1 to give polyurethane elastic fibers. The sugar fatty acid ester was a mixture of the mono-ester and the di- and tri-esters in a weight proportion of 70 : 30, and the fatty acid moiety comprised stearic acid and palmitic acid.

In the test for resistance to color change due to gas, the said fibers gave a $\Delta b$ value of 1.5, while the fibers not containing the sugar fatty acid ester gave a $\Delta b$ value of 5.5. Thus, remarkable improvement was observed. Good improvement was also observed in resistance to chlorine.

EXAMPLE 15

The tertiary nitrogen atom-containing polymer as used in Example 1 was added to the polyurethane (intrinsic viscosity, 1.02) prepared as in Example 1 using diethylamine as the blocking agent to make a tertiary nitrogen content of 80 milliequivalents per kg of the polyurethane, and the resultant mixture was subjected to dry spinning to obtain polyurethane elastic fibers, of which the strength was 1.02 g/d and the modulus was 10.5 g.

The fibers were wound up around a cheese and subjected to heat treatment at 100° C. for 8 hours. The elastic fibers obtained after heat treatment had an intrinsic viscosity of 1.7, a strength of 1.5 g/d and a modulus of 13.0. They showed excellent resistance to color change due to gas and color fastness and were much improved in recovery from stretching and chemical resistance.

When the tertiary nitrogen atom-containing diol having a hydroxyl group at the terminal position was incorporated, any improvement in physical properties was not produced by heat treatment.

What is claimed is:

1. A polyurethane composition which comprises (A) a polyurethane and (B) a tertiary nitrogen atom-containing polymer incorporated therein in an amount sufficient to stabilize the polyurethane (A), said polymer (B) being the reaction product between (C) a tertiary nitrogen atom-containing diol and an excessive amount of (D) an organic diisocyanate, the terminal isocyanate group in said reaction product being blocked with a monoamine and/or a dialkylhydrazine.

2. The composition according to claim 1, wherein the polymer (B) is incorporated in an amount of 10 to 400 milliequivalents (in terms of the tertiary nitrogen atom) per kilogram of the polyurethane (A).

3. The composition according to claim 1, wherein the diol (C) is a diol of the formula:

$$HO-A-OH \qquad (I)$$

wherein A is a divalent group of the formula:

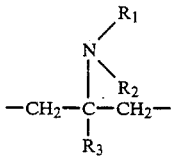

(II)

wherein $R_1$ and $R_2$ are, the same or different, each a $C_1-C_4$ alkyl group, or when taken together with the adjacent nitrogen atom, they may represent a nitrogen-containing heterocyclic ring and $R_3$ is a $C_1-C_4$ alkyl group, or of the formula:

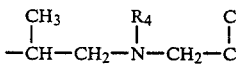

(III)

wherein $R_4$ is a $C_1-C_{12}$ alkyl group.

4. The composition according to claim 3, wherein $R_4$ in the formula (III) is ethyl.

5. The composition according to claim 3, wherein $R_1$ and $R_2$ in the formula (II) are each a $C_1-C_4$ alkyl group.

6. The composition according to claim 1, wherein the monoamine is diethylamine or butylamine.

7. The composition according to claim 1, wherein the dialkylhydrazine is dimethylhydrazine.

8. The composition according to claim 1, wherein the polymer (B) has a number average molecular weight of 2,000 to 6,000.

9. The composition according to claim 1, wherein the polyurethane (A) has a weight average molecular weight of 20,000 to 100,000.

10. The composition according to claim 1, which comprises additionally an antioxidizing agent, a ultraviolet ray absorber or a sugar fatty acid ester.

11. The composition according to claim 1 in a shaped form.

12. The composition according to claim 11, wherein the shaped form is an elastic fiber.

* * * * *